United States Patent
Rand et al.

(10) Patent No.: US 8,948,357 B2
(45) Date of Patent: Feb. 3, 2015

(54) METHOD AND SYSTEM FOR NON-TRADITIONAL DIRECTORY ASSISTANCE

(75) Inventors: Thomas A. Rand, Allen, TX (US); Erik Trusler, St. Louis, MO (US); Timothy Sheridan, Arroyo Grande, CA (US); Gary Alpert, San Ramon, CA (US); Denise Archibald, Carol Stream, IL (US); Nelson Cain, McKinney, TX (US); Debra J. Wilke, Sunset Hills, MO (US); Gary Hensley, San Antonio, TX (US); Janie Mercado Braun, Canyon Lake, TX (US); Denise Perry, Guilford, CT (US); Sidney A. Minnick, Jr., Plano, TX (US); Jeffrey C. Reid, West Sacramento, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2162 days.

(21) Appl. No.: 11/754,075

(22) Filed: May 25, 2007

(65) Prior Publication Data

US 2008/0292071 A1    Nov. 27, 2008

(51) Int. Cl.
*H04M 15/00* (2006.01)
*H04M 3/493* (2006.01)
*H04M 3/487* (2006.01)
*G06Q 30/00* (2012.01)

(52) U.S. Cl.
CPC .......... *H04M 3/4931* (2013.01); *H04M 3/4878* (2013.01); *H04M 2242/15* (2013.01)
USPC ..................... 379/114.13; 705/14.4

(58) Field of Classification Search
CPC .......................... H04M 3/4878; H04M 3/4931
USPC ............... 379/218.01, 114.02, 114.1, 114.12, 379/114.13; 705/14.4, 14.69–14.71
See application file for complete search history.

(56) References Cited

U.S. PATENT DOCUMENTS

| | | |
|---|---|---|
| 4,850,007 A | 7/1989 | Marino et al. |
| 5,987,408 A | 11/1999 | Gupta |
| 6,052,439 A | 4/2000 | Gerszberg et al. |
| 6,704,403 B2 | 3/2004 | Lurie et al. |
| 6,999,563 B1 | 2/2006 | Thorpe et al. |
| 7,200,413 B2 | 4/2007 | Montemer et al. |
| 7,212,615 B2 | 5/2007 | Wolmuth |
| 8,553,850 B2 * | 10/2013 | Vanier et al. ................. 379/67.1 |
| 2003/0223565 A1 | 12/2003 | Montemer |
| 2003/0225682 A1 | 12/2003 | Montemer |
| 2004/0006511 A1 | 1/2004 | Montemer |

(Continued)

OTHER PUBLICATIONS

Gladden, G.R., "SMART Talk Gateway Detailed Specification for the Pacific Bell Directory—DRAFT," Volt Delta Resources, Inc., 76 pp., Jul. 21, 1989.

*Primary Examiner* — Fan Tsang
*Assistant Examiner* — Solomon Bezuayehu
(74) *Attorney, Agent, or Firm* — Akerman LLP; Michael K. Dixon; Roy P. Zachariah

(57) ABSTRACT

A directory assistance service includes a database and an interface module. The database stores a set of audio advertisements, and the audio advertisements are priced based on a tiered pricing model. The interface module is in communication with the database and receives a directory assistance request from a caller, plays the caller one or more audio advertisements from the database, and charges an advertiser for playing the audio advertisements based on the tiered pricing model.

20 Claims, 5 Drawing Sheets

(56) References Cited

U.S. PATENT DOCUMENTS

| | | |
|---|---|---|
| 2004/0010518 A1 | 1/2004 | Montemer |
| 2005/0240409 A1 | 10/2005 | Gallistel |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0222322 A1* | 10/2006 | Levitan .................... 386/68 |
| 2008/0228893 A1* | 9/2008 | MacDonald et al. ......... 709/207 |

* cited by examiner

METHOD AND SYSTEM FOR NON-TRADITIONAL DIRECTORY ASSISTANCE

FIELD OF THE DISCLOSURE

The present disclosure generally relates to telephone directory assistance.

BACKGROUND

Directory assistance services are provided to help telephone subscribers locate telephone directory numbers of other subscribers. The services are customarily provided by a directory assistance operator connected to the requesting caller via a switching system. Early designs of directory assistance systems required operators to refer to books and file cards to find the desired directory numbers. As directory assistance traffic increased, more efficient and automated techniques and systems were introduced to furnish the required service.

Conventional directory assistance services charge a fee to the caller for dialing the directory assistance service, and charge an additional fee if the caller elects to have the call completed by the directory assistance service. More recent directory assistance services are subsidized by advertising in the form of one or more recorded messages played to the caller.

DETAILED DESCRIPTION OF THE DRAWINGS

A directory assistance service receives a directory assistance request telephone call from a caller and uses the request along with additional factors in selecting one or more audio advertisements for play during the call. There are four types of audio advertisements in the directory assistance service: business category search, business name re-direct, requested listing, and sponsorship advertisements. The audio advertisements played to the caller during the directory assistance request are from one or more of these types of audio advertisements. During the directory assistance request, the directory assistance service offers to complete the telephone call directly from the caller to an advertiser. The advertiser is charged to have an audio advertisement played, and also for any telephone call completed by the service. The audio advertisements are priced using a tiered pricing model. The tiered pricing model charges advertisers different amounts based on various criteria.

Figure 1:
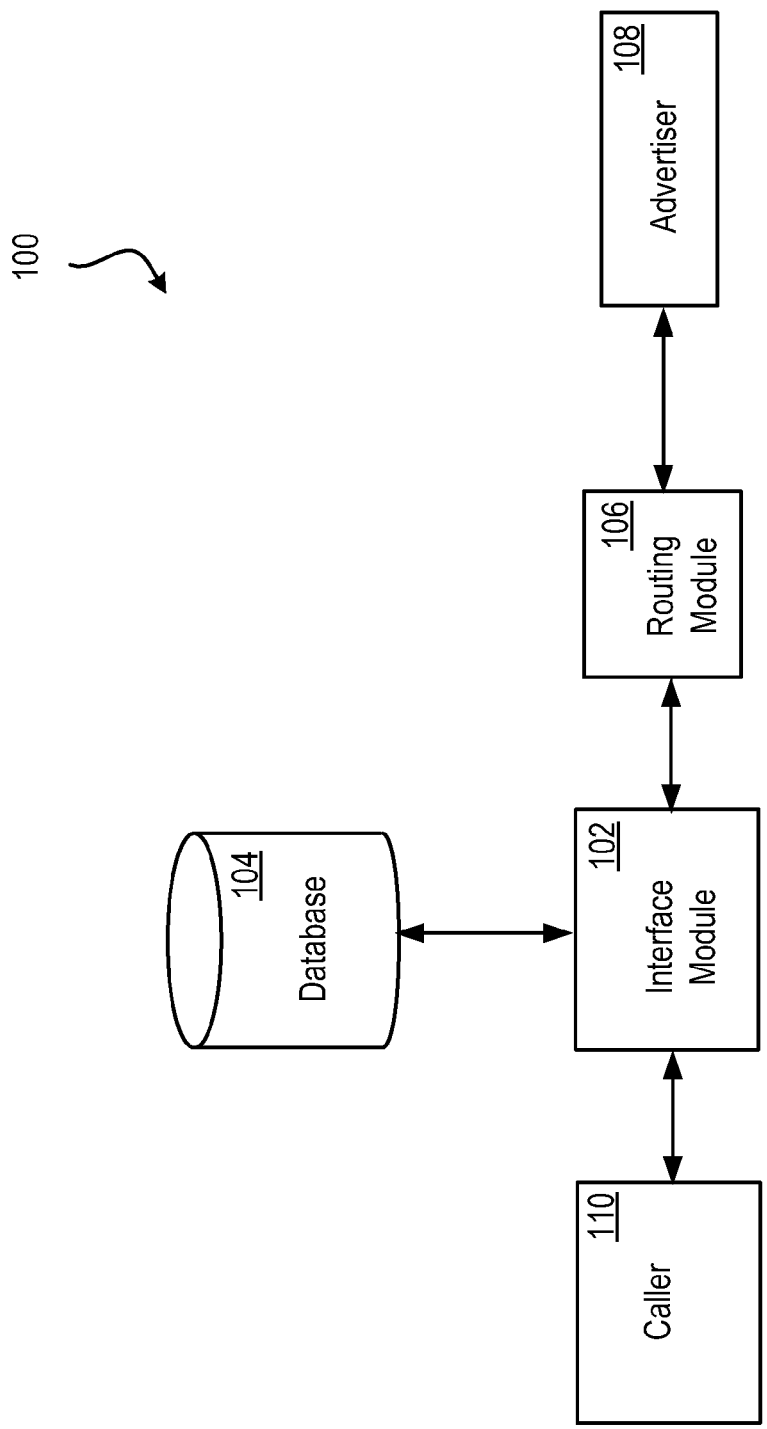
FIG. 1 is a block diagram of a directory assistance service.

FIG. 1 shows a block diagram of a directory assistance service 100 including an interface module 102, a database 104, a routing module 106, and an advertiser 108. A caller 110 places a telephone call, free of charge, to the directory assistance service 100. The interface module 102 receives the telephone call from the caller 110, and waits for a directory assistance request. The interface module 102 selects the directory advertisements based on the location, time of the day, day of the week, and/or keyword criteria of the directory assistance request. Depending on the directory assistance request, the interface module 102 selects one or more directory advertisements stored in the database 104 from among four types: business category search, business name re-direct, requested listing, and sponsorship.

Business category search advertisements are used when the caller requests directory assistance for a listing of a certain type of business, such as florists. If at least one audio advertisement stored in the database 104 matches the category requested by the caller 110, the interface module 102 plays the audio advertisements that match the category requested. If the number of audio advertisements related to the business category request is more than an acceptable, preferably preset number, then the interface module 102 rotates the audio advertisements played to the caller 110. However, if none of the audio advertisements saved in the database 104 match the category requested by the caller 110, then the interface module 102 selects one or more audio advertisements at random to be played to the caller. The advertiser 108 is charged if their advertisement is played. The caller 110 is also given an opportunity to be directly connected to the advertiser 108 as the audio advertisement is playing. If the caller 110 elects to have the telephone call directly completed to the advertiser 108, then the interface module 102 passes the telephone call to the routing module 106 for completion of the telephone call to the advertiser 108 and the advertiser is assessed an additional fee.

Business name re-direct audio advertisements are used when the caller requests a listing by name. For example, if the caller 110 requests the telephone number for a specific restaurant that does not have an advertisement stored in the database 104, then before the telephone number for the specific restaurant requested is given, the caller 110 hears one or more audio advertisements for advertisers that may be, for example, other restaurants. The caller 110 is given the option to receive the telephone number of the specific restaurant requested or the telephone number for the advertiser 108. In this example, the advertiser 108 pays for the business name re-direct audio advertisement to be played, and a surcharge if the caller 110 elects to have the call completed to the advertiser 108. If there are multiple audio advertisements for competing restaurants saved in the database 104, the audio advertisements are preferably rotated and/or prioritized based on selection criteria by the interface module 102. For, example if the advertiser 108 pays more than a competing advertiser for an audio advertisement to be played, then the advertiser's audio advertisement is given a higher priority and/or rotated more frequently when the interface module 102 selects the audio advertisements to be played.

The requested listing advertisement is played when a listing requested by the caller 110 corresponds to an advertiser 108 having an audio advertisement in the database 104. In this situation, the audio advertisement of the advertiser 108 is played, and preferably offers the caller a discount or other incentive if the caller connects directly to the advertiser 108. The advertiser 108 has the option to include a verbal coupon in the audio advertisement offering the caller 110 a discount, if the caller states that the caller heard about the advertiser 108 from the audio advertisement. Another feature of the verbal coupon is to supply the caller 110 with a unique code, for a discount, during the audio advertisement. If the caller 110 contacts the advertiser 108 and recites the unique code, then the caller receives the discount associated with the unique code. The advertiser 108 has the ability to change the unique code played in the audio advertisement periodically, such as daily, weekly, monthly, or yearly. The advertiser 108 is charged a fee for the audio advertisement to be played, and a surcharge if the caller 110 elects to have the interface module 102 complete the telephone call to advertiser 108.

The call sponsorship advertisement may be played at any time during the directory assistance request, and regardless of the type of listing requested. If the caller 110 calls for a specific restaurant, for example, and the advertiser 108 has purchased a call sponsorship advertisement, the interface module 102 plays the audio advertisement for the advertiser. The advertiser 108 is charged a fee every time the interface module 102 plays the audio advertisement. If for instance the advertiser 108 elects to have an audio advertisement played at both the beginning and at the end of a directory assistance request, the advertiser pays for both of the audio advertisements to be played. Call completion may or may not be offered with the sponsorship advertisement.

The audio advertisements in the directory assistance service 100 are priced using a tiered model. The advertiser 108 is placed into one of several pricing levels or tiers based on the value to the advertiser for a caller being delivered to their business. For example, a lawyer may be placed in a higher tier than a florist and therefore assessed more for playing his audio advertisement. Also, a nationwide business with multiple locations may be assessed more for audio advertisements and call completion than a small business owner with only one location, because the nationwide business has more locations to which the telephone call is routed. Each tier has multiple pre-set amounts to be charged to the advertiser 108. The advertiser 108 selects a pre-set amount to be charged to the advertiser as a recurring charge, for advertising in the directory assistance service 100. The recurring charge may be assessed to the advertiser 108 periodically, such as weekly, monthly, or yearly. The cost of playing the audio advertisements and call completion are taken out of the pre-set amount charged to the advertiser 108. The rates charged to the advertiser 108 for call completion, and for playing an audio advertisement, may vary depending on the tier level the advertiser is assigned and/or the value placed on the directory assistance service 100 by the advertiser. The value placed on the audio advertisement by the advertiser 108 is determined by the amount the advertiser is willing to pay for the audio advertisement to be played and the amount the advertiser is willing to pay to have the telephone call completed.

Figure 2:
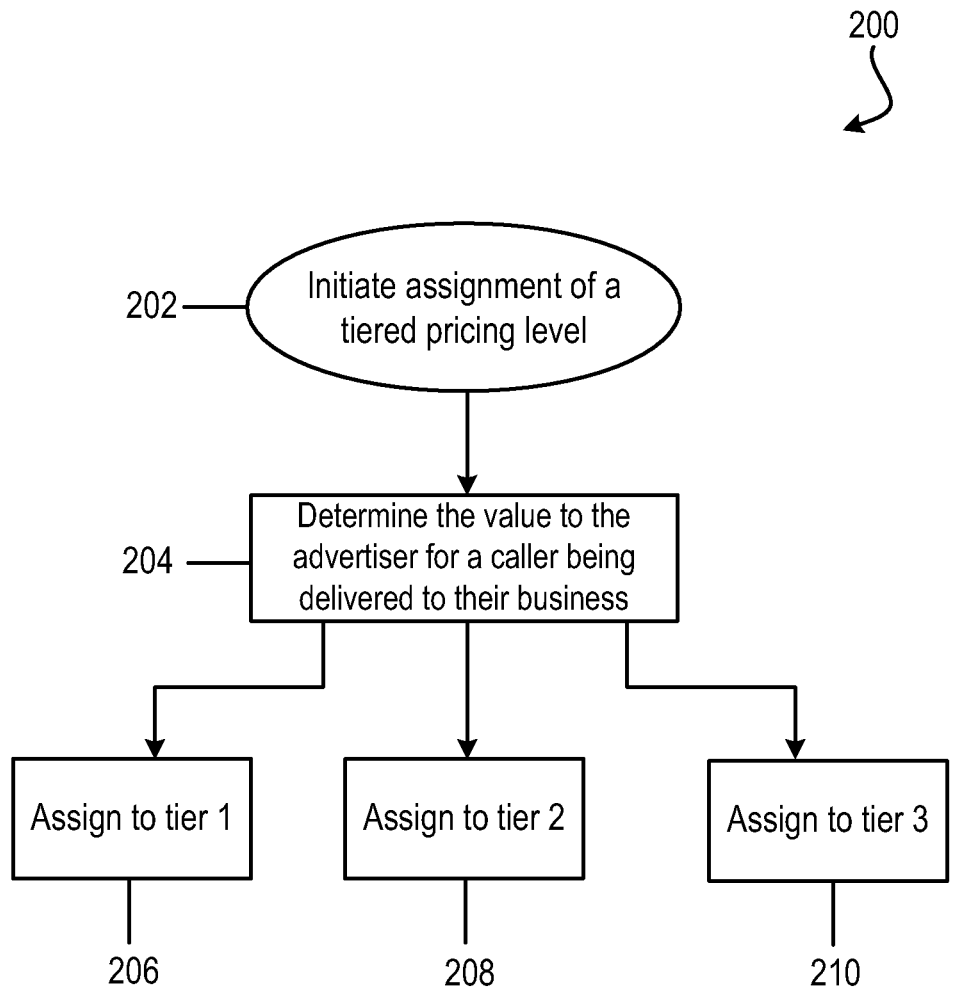
FIG. 2 is a flow chart of a method for assigning an advertiser to a tier pricing level.

FIG. 2 shows a flow chart of a method 200 for assigning an advertiser to a tier pricing level. At block 202, the value to the advertiser for a caller being delivered to their business is determined at block 204. The advertiser is assigned to one of several tiers in the tiered pricing model based on the value of an audio advertisement to the advertiser, the size, the number of locations and/or the type of their business. For example, a large company with multiple locations to which the telephone called may be routed and that has a high priced product may be assigned to a higher tier than a small company with a lower priced product. However, a large company that has a low price product may be assigned to a lower tier than a small company that has a high priced product. The smaller company with a high priced product may be assigned to a higher tier because the value of the audio advertisement and telephone call completion is more for the company that has a higher priced product than the company that has a lower priced product. At block 206, if the advertiser is a small business and/or does not make a large amount on a transaction, then the advertiser is assigned to the first tier. If the advertiser has a few locations, places more value on the audio advertisement, and/or has higher priced products than an advertiser in the first tier, the advertiser is assigned to the second tier at block 208. At block 210, a large business with multiple locations and/or even higher priced products, as compared to the first two tiers, is assigned to the third tier. For example, a florist with only one location is assigned to a lower tier than a professional with only one location because the customer value is higher for a call delivered to the professional than the florist. The advertiser assigned to the second tier is charged more for playing an audio advertisement and for call completion than an advertiser assigned to the first tier, and the advertiser assigned to the third tier is charged even more than an advertiser assigned to either the first or second tiers based on the value of the directory assistance service 100 to the business.

Figure 3:
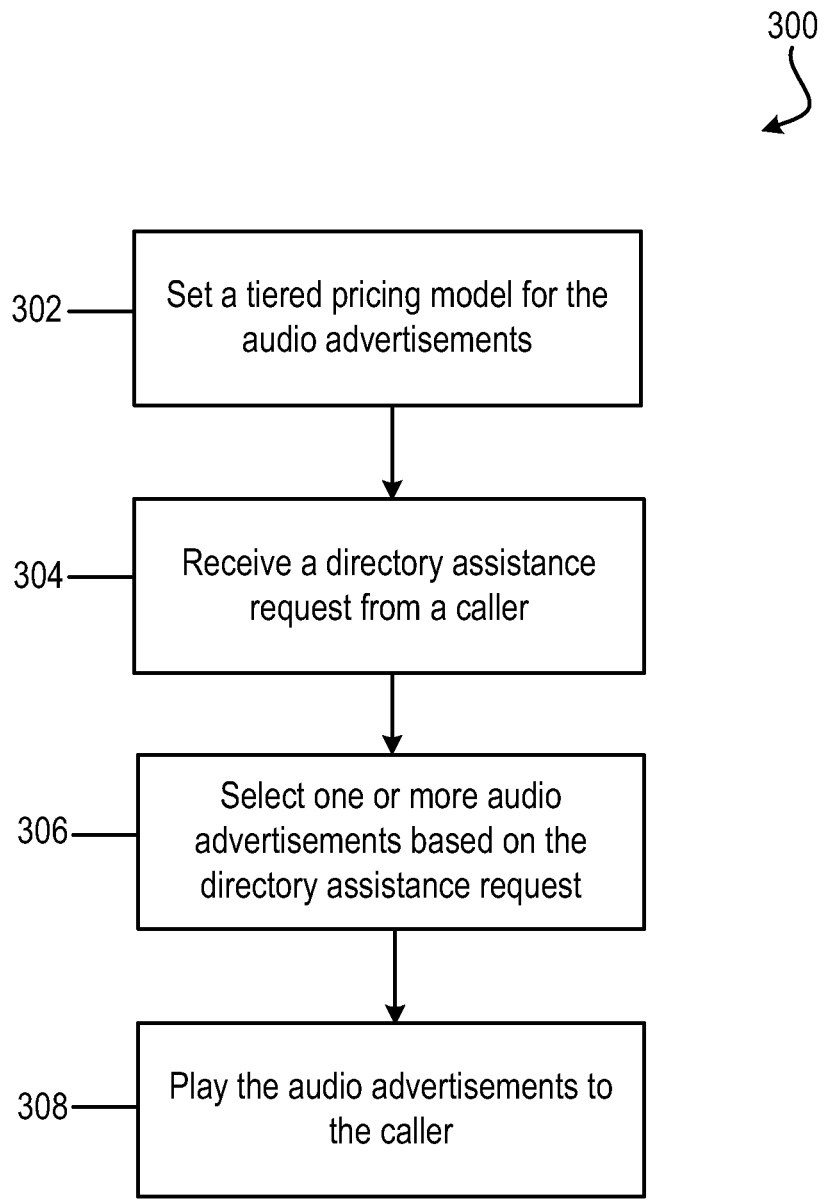
FIG. 3 is a flow chart of a method for processing a directory assistance request.

FIG. 3 shows a flow chart of a method 300 for processing a directory assistance request. At block 302, a tiered pricing model is set for the audio advertisements. The tiered pricing model charges different amounts to an advertiser for playing an audio advertisement and telephone call completion based on the size, number of locations and/or type of business conducted by the advertiser. For example, the tiered pricing model charges a professional more than a florist for playing an audio advertisement or completing a telephone call. At block 304, a directory assistance service receives a directory assistance request from a caller. The directory assistance service selects one or more audio advertisements to play to the caller based on the directory assistance request at block 306. The audio advertisements are selected from a database of the directory assistance service. At block 308, the audio advertisements are played to the caller.

Figure 4:
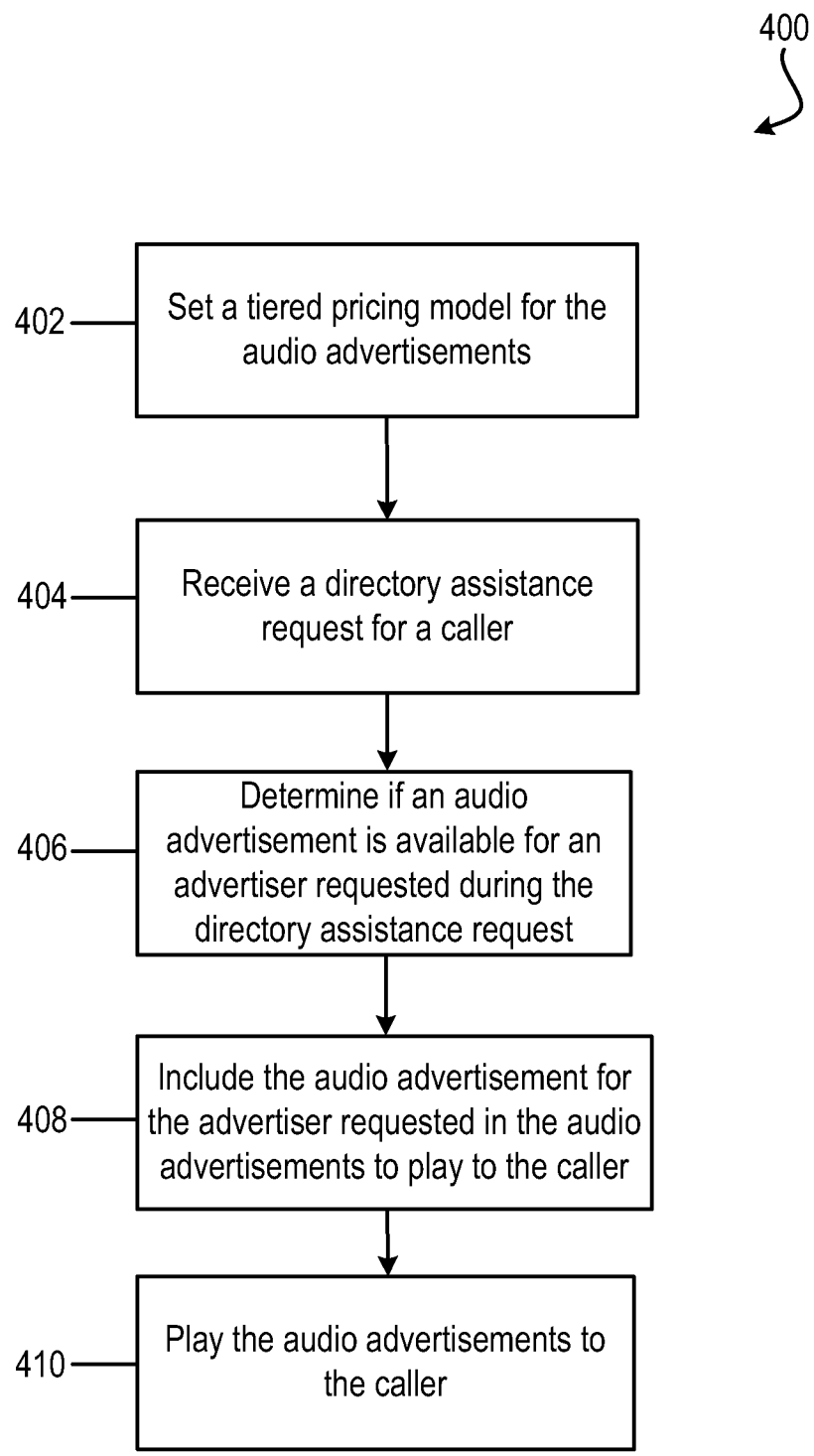
FIG. 4 is a flow chart of a method for selecting a plurality of audio advertisements for play by a directory assistance service.

FIG. 4 shows a flow chart of a method 400 for selecting a plurality of audio advertisements for play by the directory assistance service. At block 402, a tiered pricing model is set for one or more audio advertisements. The tiered pricing model charges different amounts to an advertiser for playing an audio advertisement and telephone call completion based on the size, number of locations and/or type of business conducted by the advertiser. At block 404, a directory assistance service receives a directory assistance request from a caller. The directory assistance service determines if an audio advertisement is available for an advertiser requested during the directory assistance request at block 406. The audio advertisement for the advertiser request is included in the audio advertisements played at block 408. At block 410, the audio advertisements are played to the caller.

Figure 5:
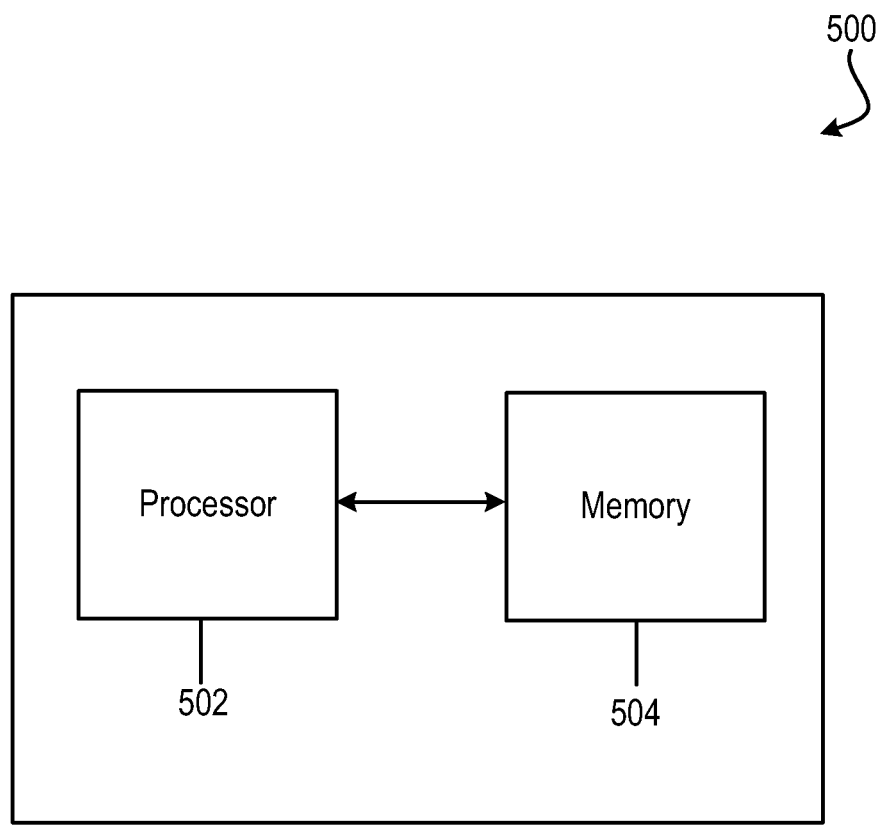
FIG. 5 is a block diagram of a data processing device.

FIG. 5 shows a block diagram of a data processing device 500 comprising a processor 502 and a computer-readable medium, such as a memory 504. The memory 504 stores a set of instructions to manipulate the processor to perform the methods 200, 300, and 400 of FIGS. 2, 3, and 4 above. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosed subject matter is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A directory assistance service system comprising:
    a memory that stores instructions;
    a processor that executes the instructions to perform operations, the operations comprising:
        storing a set of audio advertisements priced on a tiered pricing model, wherein the set of audio advertisements are placed in different tiers based on a size of an advertiser associated with a particular advertisement, a type of business of the advertiser, and a number of locations of the advertiser; and
        receiving a directory assistance request from a caller;
        selecting an audio advertisement from the set of audio advertisements;
        playing, to the caller, the audio advertisement that is selected from the set of audio advertisements and
        charging, based on the tiered pricing model, the advertiser for playing the audio advertisement that is selected from the set of audio advertisements, wherein the set of audio advertisements is rotated for selection, and wherein the audio advertisement that is selected from the set of audio advertisements is rotated more frequently in response to the advertiser paying more for the audio advertisement that is selected from the set of audio advertisements.

2. The directory assistance service system of claim 1 wherein the directory assistance request is free of charge to the caller.

3. The directory assistance service system of claim 1 further comprising a routing module configured to connect the caller to the advertiser.

4. The directory assistance service system of claim 1 wherein the audio advertisement that is selected from the set of audio advertisements is played based on a location of the caller.

5. The directory assistance service system of claim 1 wherein one of the set of audio advertisements includes a verbal coupon.

6. The directory assistance service system of claim 1 wherein the set of audio advertisements includes a different audio advertisement for a different advertiser requested in the directory assistance request.

7. The directory assistance service system of claim 1 wherein a level of the tiered pricing model is based on a value to the advertiser of the directory assistance request.

8. A method comprising:
    storing a set of audio advertisements priced on a tiered pricing model, wherein the set of audio advertisements are placed in different tiers based on a size of an advertiser associated with a particular advertisement, a type of business of the advertiser, and a number of locations of the advertiser;
    receiving a directory assistance request from a caller;
    selecting, by utilizing instructions from memory that are executed by a processor, an audio advertisement from the set of audio advertisements;
    playing, to the caller, the audio advertisement that is selected from the set of audio advertisements; and
    charging, based on the tired pricing model, the advertiser for playing the audio advertisement that is selected from the set of audio advertisements, wherein the set of audio advertisements is rotated for selection, and wherein the audio advertisement that is selected from the set of audio advertisements is rotated more frequently in response to the advertiser paying more for the audio advertisement that is selected from the set of audio advertisements.

9. The method of claim 8 wherein selecting the audio advertisement further comprises selecting the audio advertisement to be played based on a location of the caller.

10. The method of claim 8 further comprising connecting the caller to the advertiser.

11. The method of claim 8 wherein storing the set of audio advertisements further comprises storing one of the set of audio advertisements that includes a verbal coupon.

12. The method of claim 8 further comprising:
    including a different audio advertisement of a different advertiser requested during the directory assistance request of the caller in the set of audio advertisements.

13. The method of claim 8 wherein storing the set of audio advertisements priced on the tiered pricing model further comprises including a level of the tiered pricing model that is based on a value to the advertiser of the directory assistance request.

14. A computer readable device comprising a plurality of instructions, which when loaded and executed by a processor, cause the processor to perform operations, the operations comprising:

storing a set of audio advertisements priced on a tiered pricing model, wherein the set of audio advertisements are placed in different tiers based on a size of an advertiser associated with a particular advertisement, a type of business of the advertiser, and a number of locations of the advertiser;

receiving a directory assistance request from a caller;

selecting an audio advertisement from the set of audio advertisements;

playing, to the caller, the audio advertisement that is selected from the set of audio advertisements; and charging, based on the tiered pricing model, the advertiser for playing the audio advertisement that is selected from the set of audio advertisements, wherein the set of audio advertisements is rotated for selection, and wherein the audio advertisement that is selected from the set of audio advertisements is rotated more frequently in response to the advertiser paying more for the audio advertisement that is selected from the set of audio advertisements.

15. The computer readable device of claim 14 wherein the directory assistance request is free of charge to the caller.

16. The computer readable device of claim 14 wherein the audio advertisement selected from the set of audio advertisements is selected based on a location of the caller.

17. The computer readable device of claim 14 wherein the set of audio advertisements includes a different audio advertisement of a different advertiser requested during the directory assistance request of the caller.

18. The computer readable device of claim 14 wherein one of the set of audio advertisements includes a verbal coupon.

19. The computer readable device of claim 14 further comprising instructions to connect the caller to the advertiser.

20. The computer readable device of claim 14 wherein a level of the tiered pricing model is based on a value to the advertiser of the directory assistance request.

\* \* \* \* \*